United States Patent
Lilja et al.

(10) Patent No.: US 8,199,795 B2
(45) Date of Patent: Jun. 12, 2012

(54) COMMUNICATION DEVICE AND DATA TRANSMISSION METHOD BETWEEN AT LEAST TWO COMMUNICATION DEVICES

(75) Inventors: Harri Lilja, Oulunsalo (FI); Jari Vallström, Oulu (FI)

(73) Assignee: Nokia Corporation, Espoo (FI)

( * ) Notice: Subject to any disclaimer, the term of this patent is extended or adjusted under 35 U.S.C. 154(b) by 1004 days.

(21) Appl. No.: 11/146,755

(22) Filed: Jun. 7, 2005

(65) Prior Publication Data

US 2005/0286617 A1 Dec. 29, 2005

(30) Foreign Application Priority Data

Jun. 28, 2004 (EP) ..................................... 04102988

(51) Int. Cl.
*H04B 1/38* (2006.01)

(52) U.S. Cl. ........................................ 375/219; 455/73
(58) Field of Classification Search .................. 375/219; 455/73, 78, 553.1
See application file for complete search history.

(56) References Cited

U.S. PATENT DOCUMENTS

| 5,299,228 | A | 3/1994 | Hall | |
| 6,943,667 | B1 * | 9/2005 | Kammer et al. | 340/286.01 |
| 2002/0065730 | A1 * | 5/2002 | Nii | 705/26 |
| 2002/0187776 | A1 * | 12/2002 | Brassil et al. | 455/417 |
| 2004/0002330 | A1 | 1/2004 | Chiprapu | |
| 2004/0110508 | A1 * | 6/2004 | Haartsen | 455/445 |
| 2005/0066250 | A1 * | 3/2005 | Coleman et al. | 714/752 |
| 2005/0190782 | A1 * | 9/2005 | Buckley et al. | 370/437 |

FOREIGN PATENT DOCUMENTS

WO   WO 01/10150 A1   8/2001

\* cited by examiner

*Primary Examiner* — David C. Payne
*Assistant Examiner* — Brian J Stevens
(74) *Attorney, Agent, or Firm* — Squire Sanders (US) LLP

(57) ABSTRACT

A data transmission method between at least two mobile communication devices is provided, a communication device comprising a first and a second transceiver. The first transceiver communicates with a transceiver of another device with a data rate higher than that of the second transceiver, and the second transceiver communicates with a transceiver of another device with power consumption level lower than that of the first transceiver. The device is configured to communicate with another communication device using the first transceiver when data is to be transmitted between devices; stop using the first transceiver when data transmission ceases, and communicate with another communication device using the second transceiver to set up the use of first transceiver when a need to send data arises.

12 Claims, 2 Drawing Sheets

Figure 1:
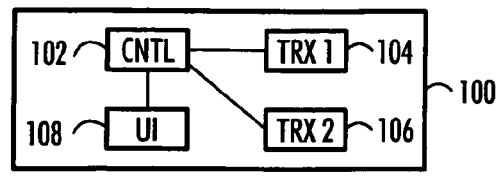

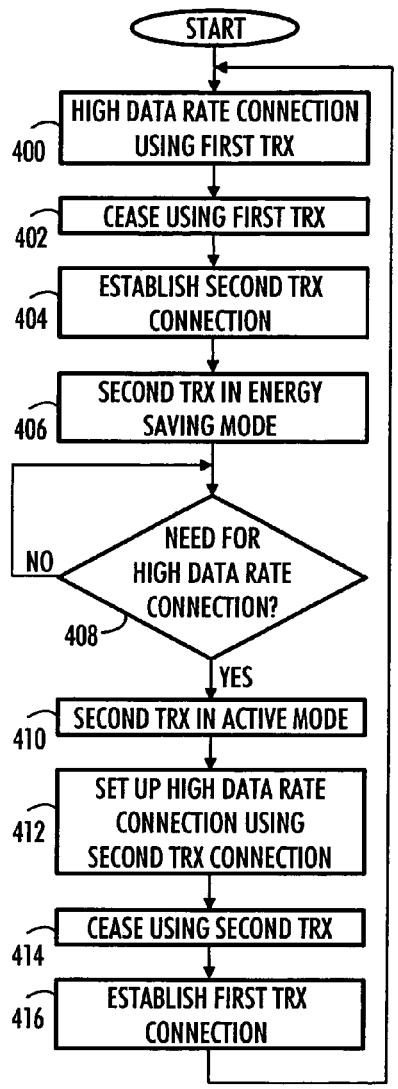
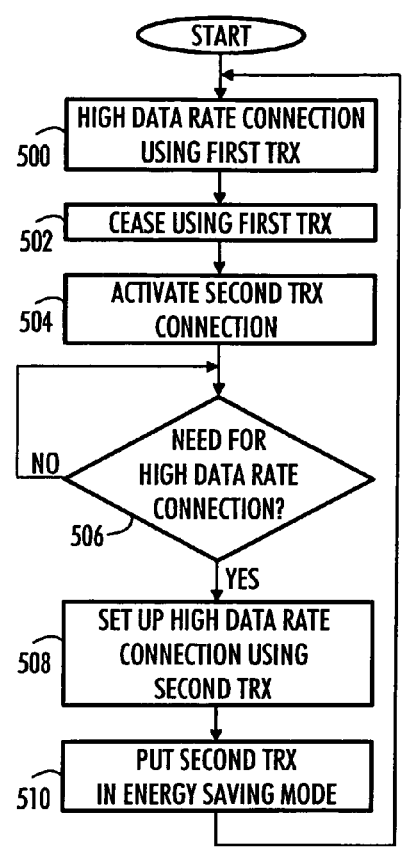
FIG. 4
FIG. 5

COMMUNICATION DEVICE AND DATA TRANSMISSION METHOD BETWEEN AT LEAST TWO COMMUNICATION DEVICES

FIELD

The invention relates to data transmission where the requirements of both high data rate transmission and power consumption are taken into account.

BACKGROUND

In the past, wireless communication was used mainly for speech transmission. Various new services have extended the usability of commercial radio systems, such as cellular radio systems, to a new level. The transmission bandwidth of radio systems has increased and services requiring high bandwidth have been introduced. An example of such a service is video transmission.

In addition, new wireless solutions with different characteristics have been presented. Wireless Local Area Network (WLAN) offers high bandwidth. Low power radio frequency (LPRF) connections, such as Bluetooth, offer short range radio based communications with relatively low power consumption. Also the cellular radio systems offer various alternatives for communication.

An important parameter in the design of mobile systems and devices is power consumption. Mobile devices are usually battery or accumulator based and low power consumption increases the usability of these devices. The combination of high data rate transmission and long battery life is still a difficult problem in mobile communications. This applies especially to systems where a large amount of data needs to be transmitted occasionally and at the same time long operating times are required because of the battery based operation.

In prior art, when a high data rate connection is used and there is a pause in the communication, the connection may enter a sleep mode. In sleep mode, the power consumption is smaller than in active mode, which is used in data transmission. However, the power consumption in sleep mode may still be relatively large.

BRIEF DESCRIPTION OF THE INVENTION

An object of the invention is to provide an improved solution in data transmission where the requirements of both high data rate transmission and power consumption are taken into account. According to an aspect of the invention, there is provided a data transmission method between at least two mobile communication devices, each device comprising at least a first and a second transceiver, wherein the first transceiver is configured to communicate with a transceiver of another device at a data rate higher than that of the second transceiver, the second transceiver is configured to communicate with a transceiver of another device at a power consumption level lower than that of the first transceiver. In the invention, a mobile communication device communicating with another communication device using the first transceiver when data is to be transmitted between devices, ceasing the use of the first transceiver when there is no more data to transmit, and communicating with another communication device using the second transceiver to set up the use of the first transceiver when a need to send data arises.

According to another aspect of the invention, there is provided a mobile communication device comprising: at least a first and a second transceiver, wherein the first transceiver configured to communicate with a transceiver of another device at a data rate higher than that of the second transceiver; the second transceiver configured to communicate with a transceiver of another device at a power consumption level lower than that of the first transceiver. The mobile device is configured to communicate with another communication device using the first transceiver when data is to be transmitted between devices; stop using first transceiver when data transmission ceases, and communicate with another communication device using the second transceiver to set up the use of first transceiver when a need to send data arises.

According to another aspect of the invention, there is provided a communication device comprising a core unit and at least one peripheral unit, each comprising at least a first and a second transceiver to communicate with each other; the first transceiver utilising a data rate connection higher than that of the second transceiver, the second transceiver utilising connection at a power consumption level lower than the first transceiver. The core unit and at least one peripheral unit are configured to use the first transceivers for communication when data is to be transmitted between the units; cease using the first transceivers when there is no more data to transmit; and communicate with each other using the second transceivers to set up the use of the first transceivers when a need to send data arises.

The invention improves the usability of devices needing low power consumption by providing a low power signalling connection which enables a power consuming high data rate connection to be shut down when data transmission is not required.

In an embodiment of the invention, the solution is used in multipart user equipment comprising a core unit and a set of peripheral units. Each unit comprises at least two transceivers. When a connection with a high data rate between the units is needed, the connection is established with suitable transceivers capable of such a connection. When the connection is terminated, the units may establish a connection with another transceivers which offer lower data rate but have lower power consumption. Thus an increase in the battery life of the units is achieved.

LIST OF DRAWINGS

Figure 2:
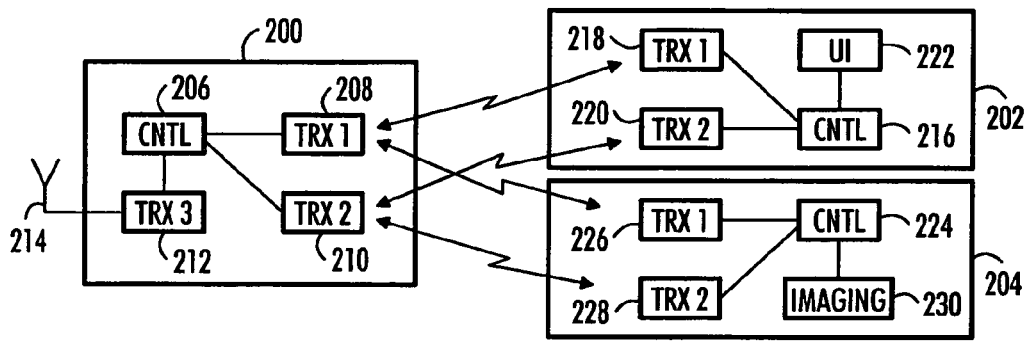

In the following, the invention will be described in greater detail with reference to the embodiments and the accompanying drawings, in which FIG. 1 shows an example of a communication device;

FIG. 2 illustrates an example of multipart user equipment and

Figure 3:
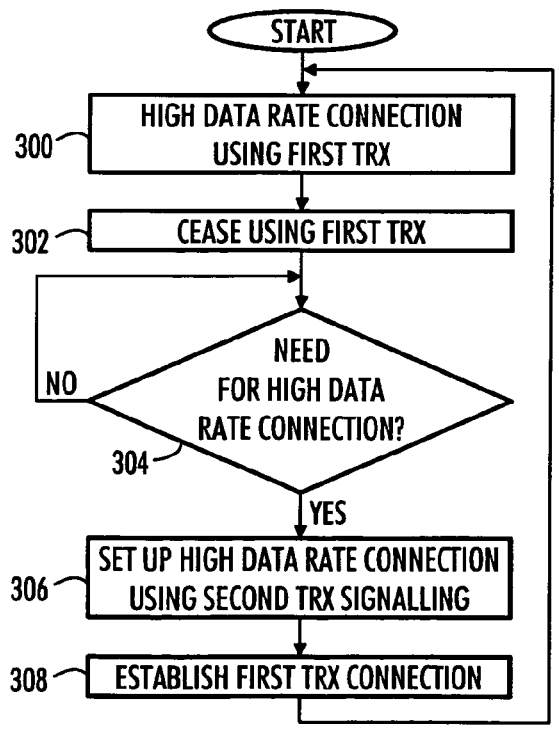

FIGS. 3 to 5 illustrating embodiments of the invention are flowcharts.

DESCRIPTION OF EMBODIMENTS

With reference to FIG. 1, examine an example of a communication device 100 to which embodiments of the invention can be applied. The device may be a mobile terminal, or a personal digital assistant or a personal computer or another device configured to wireless communication.

The device comprises a control unit 102 for controlling the functions of the device 100. The device further comprises at least two transceivers 104, 106 operationally connected to the control unit 102. The first transceiver 104 is configured to communicate with a transceiver of another device at a data rate higher than that of the second transceiver 106 while the second transceiver 106 is configured to communicate with a transceiver of another device at a power consumption lower than that of the first transceiver 104.

In an embodiment, the transceivers 104, 106 utilise different techniques. For example, the first transceiver may be a WLAN transceiver. A WLAN connection may offer a high data rate connection suitable for services requiring high bandwidth. The second transceiver may be a Bluetooth transceiver which offers a smaller data rate than a WLAN transceiver but has smaller power consumption requirements.

In another embodiment, the first transceiver may be a WLAN or Bluetooth transceiver, whereas the second transceiver is an ultrasound transceiver. The data rate offered by an ultrasound connection is smaller compared to a Bluetooth or WLAN connection but the power consumption is also smaller.

In another embodiment, the first transceiver may be a WLAN or Bluetooth transceiver, whereas the second transceiver is implemented using an RFID (Radio frequency identification) tag.

In yet another embodiment, the first transceiver may be a WLAN transceiver, but the second transceiver is a GSM (Global System for Mobile communications) transceiver.

The device may also comprise a user interface 108 operationally connected to the control unit 102. The user interface may comprise a display, a keyboard, a speaker and a microphone, for example.

FIG. 2 illustrates an embodiment where the invention is applied in connection with multipart user equipment. User equipment divided into several parts that are used in various combinations is recently being developed. Multipart user equipment or multipart radio terminals may, for example, include a small cellular core unit and a number of optimised peripheral units. The core unit of the multipart radio terminal controls the operation of the whole device. The core unit handles connections to the outside world on behalf of the peripheral units.

The peripheral units of the multipart radio terminals are optimised for specific tasks and all the peripheral units are connected to a core unit by a wireless connection. One of the peripheral units may provide a user interface for making basic phone calls and another peripheral unit may be optimised for messaging and browsing or for imaging and music, for example.

One example of multipart user equipment is a device comprising a conventional mobile phone and a set of devices dedicated to a given purpose, such as browsing or imagining. These dedicated devices use the mobile phone as a gateway to networks, such as a GSM or a WCDMA cellular network.

It should be noted that the invention is not limited to multipart user equipment. The invention may be applied to devices of various designs, as is known to one skilled in the art.

FIG. 2 shows multipart user equipment comprising a core unit 200 and two peripheral units 202, 204. The core unit 200 comprises a control unit 206 which may be realized with a processor and associated software or with discrete logic circuits or ASIC (Application Specific Integrated Circuit), for example. The core unit 200 further comprises two transceivers 208, 210 operationally connected to the control unit 206. The first transceiver 208 is configured to communicate with a transceiver of a peripheral unit or another device with a data rate higher than that of the second transceiver 210 while the second transceiver 210 is configured to communicate with a transceiver of a peripheral unit or another device with a power consumption lower than that of the first transceiver 208. The transceivers 208, 210 may be WLAN, Bluetooth, ultrasound or GSM transceivers as described above in connection with FIG. 1.

The core unit 200 may further comprise a third transceiver 212 which is configured to access a telecommunication system using an antenna 214. The transceiver is used to provides connections to outside system on behalf of the whole device. The peripherals are configured to make connections only with the core unit.

The peripheral unit 202 comprises a control unit 216 which may be realized with a processor and associated software or with discrete logic circuits or ASIC (Application Specific Integrated Circuit), for example. The peripheral unit 202 further comprises two transceivers 218, 220 operationally connected to the control unit 216 and a user interface 222. The user interface may comprise various devices such as a display, a keyboard, a microphone and a speaker, for example. The peripheral unit 202 may provide the core unit 200 with the user interface.

The peripheral unit 204 comprises a control unit 224 which may be realized with a processor and associated software or with discrete logic circuits or ASIC (Application Specific Integrated Circuit), for example. The peripheral unit 204 further comprises two transceivers 226, 228 operationally connected to the control unit 224 and imaging unit 230. The imaging unit may comprise a lens system and associated imaging apparatus. The peripheral unit 204 may be used as a digital camera and images obtained with the peripheral unit may be transmitted to various recipients using the core unit.

The above peripheral units are only two examples of possible uses for peripheral units. As one skilled in the art realizes, there may be various types of peripheral units configured to provide web access, audio services, gaming and other services to the user of multipart user equipment.

Thus, embodiments of the invention may be utilised in the data transmission between the devices of FIG. 1 and between the units of the multipart user equipment of FIG. 2. The flowchart of FIG. 3 illustrates an example where data is transmitted between the core unit 200 and the peripheral unit 202. However, the embodiment may be also utilised in a similar manner between the devices of FIG. 1 as well.

In step 300, a high data rate connection between the core unit 200 and the peripheral unit 202 is ongoing. The connection is provided using the first transceiver 208 in the core unit and the first transceiver 218 in the peripheral unit.

In step 302, the transmission of data stops and the connection between transceivers is switched off. Thus, the control units 206, 216 of the units cease using the transceivers 208, 218.

In step 304, the control units 206, 216 periodically check whether there is a need for high data rate connection.

If so, the control units 206, 216 of the core unit 200 and the peripheral unit 202 communicate with the second transceivers 210, 220 in step 306 to set up a high data rate connection.

In step 308, the high data rate connection between the core unit 200 and the peripheral unit 202 is started using the first transceiver 208 in the core unit and the first transceiver 218 in the peripheral unit.

The procedure continues from step 300.

In an embodiment, the power consumption of the second transceiver is so low that it may be kept in active mode even when the first transceivers are in use.

FIG. 4 illustrates another embodiment of the invention. In this embodiment, the second transceivers with lower power consumption are configured to have at least two modes, an active mode and an energy saving mode. In the energy saving mode the power consumption is very low.

The flowchart of FIG. 4 again illustrates an example where data is transmitted between the core unit 200 and the peripheral unit 202. However, the embodiment may be also utilised in a similar way between the devices of FIG. 1 as well.

In step 400, a high data rate connection between the core unit 200 and the peripheral unit 202 is ongoing. The connection is provided using the first transceiver 208 in the core unit and the first transceiver 218 in the peripheral unit.

In step 402, the transmission of data stops and the connection between the transceivers is switched off. Thus, the control units 206, 216 of the units cease using the transceivers 208, 218.

In step 404, the control units 206, 216 of the units 200, 202 establish a low power connection with the second transceivers 210, 220.

In step 406, the second transceivers enter an energy saving mode as there is nothing to transmit between the units.

In step 408, the control units 206, 216 of the units 200, 202 periodically check whether there is a need for a high data rate connection. Assume here that the control unit 206 of the core unit detects a need for a high data rate connection.

In step 410, the control unit 206 of the core unit commands the second transceiver 210 of the core unit to enter an active mode.

In step 412, the control unit sends a signalling message using the second transceiver 210 to the peripheral unit 202. The second transceiver 220 receives the signalling message, and conveys the message to the control unit 216 of the peripheral unit 202. The control unit 216 commands the second transceiver 220 of the peripheral unit to enter an active mode. The control units 206, 216 set up a high data rate connection by transmitting messages using the second transceivers 210, 212.

In step 414, the units 200, 202 cease using the second transceivers 210, 212.

In step 416, a high data rate connection between the core unit and the peripheral unit is established. The steps 414 and 416 may be executed simultaneously or in opposite order than described here.

The process continues from step 400.

FIG. 5 illustrates another embodiment of the invention. In this embodiment, when the high data rate connection is utilised, the second transceivers with lower power consumption are in an energy saving mode. In the energy saving mode the power consumption is very low. When the high data rate connection is terminated, the second transceivers are put into active mode. However, the power consumption of the second transceivers in active mode is lower than the power consumption of the first transceivers in a stand by mode. Thus, an increase in battery life is achieved.

The flowchart of FIG. 5 again illustrates an example where data is transmitted between the core unit 200 and the peripheral unit 202. However, the embodiment may also be utilised in a similar way between the devices of FIG. 1 as well.

In step 500, a high data rate connection between the core unit 200 and the peripheral unit 202 is ongoing. The connection is made using the first transceiver 208 in the core unit and the first transceiver 218 in the peripheral unit.

In step 502, the transmission of data stops and the connection between transceivers is terminated. Thus, the control units 206, 216 of the units cease using the transceivers 208, 218.

In step 504, the control units 206, 216 of the units 200, 202 activate a connection using the second transceivers 210, 220.

In step 506, the control units 206, 216 of the units 200, 202 periodically check whether there is a need for a high data rate connection. Assume here that the control unit 206 of the core unit detects a need for a high data rate connection.

In step 508, the control unit sends a signalling message using the second transceiver 210 to the peripheral unit 202. The second transceiver 220 receives the signalling message, and conveys the message to the control unit 216 of the peripheral unit 202. The control units 206, 216 set up a high data rate connection by transmitting messages using the second transceivers 210, 212.

In step 510, the second transceivers are put into an energy saving mode. The process continues from step 500.

In an embodiment, when the high data rate connection is utilised, the second transceivers with lower power consumption are in an energy saving mode. In the energy saving mode the power consumption is very low. When the high data rate connection is terminated, the second transceivers are put into an active mode. However, the power consumption of the second transceivers in active mode is lower than the power consumption of the first transceivers in a stand by mode. Thus, an increase in battery life is achieved.

Even though the invention has been described above with reference to an example according to the accompanying drawings, it is clear that the invention is not restricted thereto but it can be modified in several ways within the scope of the appended claims.

The invention claimed is:

1. A method for a mobile communication device, the device comprising at least a first and a second transceiver, the method comprising:
    communicating with another communication device using the first transceiver when data is to be transmitted between devices, the first transceiver being configured to communicate with a transceiver of the other device at a data rate higher than that of the second transceiver;
    ceasing the use of the first transceiver when there is no more data to transmit between the communication devices; and
    communicating with the other communication device using the second transceiver to set up the use of the first transceiver, the second transceiver being configured to communicate with a transceiver of the other device at a power consumption level lower than that of the first transceiver,
    the first and the second transmitter being used for communication between the devices at different time instants.

2. The method of claim 1, wherein when the mobile device has data to transmit to another mobile device, it communicates with the device utilizing the second transceiver.

3. The method of claim 1, wherein the device that has data to transmit to another device sends a message to said device, the message comprising a request to set up communication utilizing the first transceiver.

4. The method of claim 1, the method further comprising: putting the second transceiver into an energy saving mode when the first transceiver is transmitting or receiving.

5. The method of claim 4, wherein the second transceiver awakes from the energy saving mode to an active mode when the device ceases to use the first transceiver.

6. A method for a mobile communication device, the device comprising at least a first and a second transceiver, the method comprising:
    communicating with another communication device using the first transceiver when data is to be transmitted between devices, the first transceiver being configured to communicate with a transceiver of the other device at a data rate higher than that of the second transceiver;
    ceasing the use of the first transceiver when there is no more data to transmit;

establishing a connection with another communication device using the second transceiver after ceasing the use of the first transceiver; and communicating with the other communication device using the second transceiver to set up the use of the first transceiver, the second transceiver being configured to communicate with a transceiver of the other device at a power consumption level lower than that of the first transceiver, wherein the second transceiver enters an energy saving mode after establishing a connection with the other communication device.

7. The method of claim 6, wherein the second transceiver awakes from the energy saving mode to an active mode when a connection with the first transceiver needs to be set up.

8. A mobile communication device comprising:

at least a first and a second transceiver, wherein the mobile device is configured to communicate with another communication device using the first transceiver when data is to be transmitted between devices, the first transceiver being configured to communicate with a transceiver of the other device at a data rate higher than that of the second transceiver, stop using the first transceiver when there is no more data to transmit between the communication devices, and communicate with the other communication device using the second transceiver to set up the use of first transceiver when a need to send data arises, the second transceiver being configured to communicate with a transceiver of the other device at a power consumption level lower than that of the first transceiver, the first and second transmitter being used for communication between the devices at different time instants.

9. The device of claim 8, wherein when the device has data to transmit to another device, it is configured to communicate with the device utilizing the second transceiver.

10. The device of claim 9, wherein the device that has data to transmit to another device is configured to send a message to said device, the message comprising a request to set up communication utilizing the first transceiver.

11. An apparatus comprising a core unit and at least one peripheral unit, the core unit and each peripheral unit comprising at least a first and a second transceiver to communicate with the first and second transceiver of the at least one other unit;

wherein the core unit and at least one peripheral unit are configured to use the first transceivers for communication when data is to be transmitted between the units, the first transceiver utilizing a data rate connection higher than that of the second transceiver;

cease using the first transceivers when there is no more data to transmit between the units; and communicate with each other using the second transceivers to set up the use of the first transceivers when a need to send data arises, the second transceivers utilizing connection at a power consumption lower than the first transceivers.

12. A mobile communication device comprising:

at least a first and a second transceiver, wherein the mobile device is configured to communicate with another communication device using the first transceiver when data is to be transmitted between devices, the first transceiver being configured to communicate with a transceiver of the other device at a data rate higher than that of the second transceiver;

stop using the first transceiver when data transmission ceases;

establish a connection with another communication device using the second transceiver after ceasing the use of the first transceiver; and communicate with the other communication device using the second transceiver to set up the use of the first transceiver when a need to send data arises, the second transceiver being configured to communicate with a transceiver of the other device at a power consumption level lower than that of the first transceiver, the second transceiver being configured to enter an energy saving mode after establishing a connection with the other communication device.

* * * * *